US012786503B2

(12) United States Patent
Shinde et al.

(10) Patent No.: US 12,786,503 B2
(45) Date of Patent: Nov. 3, 2026

(54) METHOD AND SYSTEM FOR AESTHETIC NUDGING OF USER EXPERIENCE AND SUBCONSCIOUS INFLUENCE

(71) Applicant: Tata Consultancy Services Limited, Mumbai (IN)

(72) Inventors: Sujit Raghunath Shinde, Thane (IN); Karan Rajesh Bhavsar, Thane (IN); Pankaj Harish Doke, Mumbai (IN); Sanjay Madhukar Kimbahune, Mumbai (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 0 days.

(21) Appl. No.: 19/334,091

(22) Filed: Sep. 19, 2025

(65) Prior Publication Data

US 2026/0095618 A1 Apr. 2, 2026

(30) Foreign Application Priority Data

Sep. 27, 2024 (IN) ............................ 202421073359

(51) Int. Cl.
*H04N 21/431* (2011.01)
*G06F 3/01* (2006.01)
(Continued)

(52) U.S. Cl.
CPC ......... *H04N 21/4314* (2013.01); *G06F 3/016* (2013.01); *H04N 21/2542* (2013.01);
(Continued)

(58) Field of Classification Search
CPC .......................... G06F 3/016; H04N 21/2542; H04N 21/4314; H04N 21/4316; H04N 21/4821; H04N 21/812
See application file for complete search history.

(56) References Cited

U.S. PATENT DOCUMENTS 9,467,750 B2 10/2016 Banica et al.
2017/0374431 A1 12/2017 Ryan et al.

FOREIGN PATENT DOCUMENTS

AU 2019201358 B2 2/2021

OTHER PUBLICATIONS

Watson, Anthony Rayvon; "The Golden Relationships: An Exploration of Fibonacci Numbers and Phi"; Title of the item: Thesis; Date: 2017; Link: https://dukespace.lib.duke.edu/server/api/core/bitstreams/3e686e06-c11f-4965-b381-9f91f3b0c18e/content.

(Continued)

*Primary Examiner* — Michael B. Pierorazio
(74) *Attorney, Agent, or Firm* — Finnegan, Henderson, Farabow, Garrett & Dunner, LLP

(57) ABSTRACT

This disclosure relates generally to a method and system for aesthetically placing and subconsciously nudging a plurality of advertisement products within a display screen of a mobile device. State-of-the-art methods demonstrate traditional way of marketing a single product being promoted by an influencer in a short video on social media platforms. The influencer captures a main frame of the display screen while advertising the product. However, most of the space on the display screen as well as the budget associated with an advertisement remain under-utilized. The present disclosure addresses these problems through a method of creating an overlay of a grid having a plurality of aesthetic spaces within the display screen. The aesthetic spaces are supplemented with an aural and an haptic experience via embedded audio files. The grid dynamically aligns the plurality of aesthetic spaces to eye-gaze hotspots to provide an individualistic personalization of the grid.

15 Claims, 13 Drawing Sheets

(51) Int. Cl.
*H04N 21/254* (2011.01)
*H04N 21/482* (2011.01)
*H04N 21/81* (2011.01)

(52) U.S. Cl.
CPC ..... *H04N 21/4316* (2013.01); *H04N 21/4821* (2013.01); *H04N 21/812* (2013.01)

(56) References Cited

OTHER PUBLICATIONS

Basak, Rasim; "Golden Ratio and Fibonacci Sequence: Universal Footprints of the Golden Flow"; Title of the item: The Turkish Online Journal of Design Art and Communication Date: 2020.

$2^2$ $2^1$ $2^0$

Fibonacci Series: 1,2,3,5,8,13,21,34,55,89,144,233,377,610,987,1597,2584,4181,6765

METHOD AND SYSTEM FOR AESTHETIC NUDGING OF USER EXPERIENCE AND SUBCONSCIOUS INFLUENCE

PRIORITY CLAIM

This U.S. patent application claims priority under 35 U.S.C. § 119 to: Indian Patent Application number 202421073359, filed on Sep. 27, 2024. The entire contents of the aforementioned application are incorporated herein by reference.

TECHNICAL FIELD

The disclosure herein generally relates to targeted advertisements, and, more particularly, to methods and systems to aesthetical product positioning for enhanced user experience in the targeted advertisements.

BACKGROUND

Product placement attempts to incorporate commercial content in a purposeful way into a commercial/non-commercial situation. Product placement is becoming a common practice in today's marketing world, and can be experienced in a vast number of mainstream media such as movies, TV series and shows, computer games, blogs, music and music videos etc. In the contemporary world, organizations are using human influencers to advertise their products and services through mobile communications by mobile-first platforms like Instagram. Due to changing nature of target audience, these mobile-first platforms are mostly utilized to broadcast short videos. The advertisement of products and services promoted by the human influencers also utilizes the concept of short videos. While advertising the products and services by the human influencers, a display screen of mobile handsets is prominently covered by the human influencer holding the product in hand and speaking about the products and services for about 30% of the total video time. By this conventional approach, the display screen space is utilized by only one product for merchandising which is in the hand of the human influencer. This results in an under-utilization of the display screen as well as non-optimal usage of budget of an owner of the products or services. The under-utilization of the display screen is in terms of missing the untapped potential of gaining viewers while advertising products or services in the short span of time. And the non-optimal usage of budget directs towards consumption of the stipulated video time by advertising only one product of an owner of the products or services. Therefore it is important to focus on maximum utilization of the display screen as well as efficiently utilizing allotted video time for advertisement. As an Artificial Intelligence (AI) is widening hands in all directions, in the more recent approach of advertisement, the human influencers are seen to be replaced by an AI generated persona. The proper utilization of the display screen as well as optimal usage of budget of an owner of the products or services is valid in such scenario as well. The placement of the products along with the AI persona is a rule-based approach and requires a set of instructions through computer programs which is quite different than shooting a video in a studio.

Whether advertising through the human influencer or the AI persona, the main challenge while utilizing the display screen to advertise greater number of the products is to identify positions that are aesthetically pleasing. Also, it is equally challenging to assess an upper bound on the total number of products that can be placed on the display screen and the amount of space to be occupied with respect to the total display screen space. The aesthetical positioning has a greater impact on the advertisement success and hence it becomes highly appropriate to examine to what extent it influences target audience. Meaning, whether the target audience notices the product, intends to watch the content created for the product advertisement, or tempted to click on the product to explore more.

SUMMARY

Embodiments of the present disclosure present technological improvements as solutions to one or more of the above-mentioned technical problems recognized by the inventors in conventional systems. For example, in one embodiment, a method of creating aesthetic spaces for placing a plurality of advertisement products within a display screen of a mobile device is provided. The method includes receiving (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive split in one of (a) a clock-wise direction, and (b) an anti-clockwise direction. The method further includes obtaining a plurality of golden ratio dimensions associated with the plurality of dimensions of the display screen from a look-up table. A part of the display screen falling within the golden ratio dimensions forms a grid. Rest of the space of the display screen is not considered for further processing. The method further includes recursively splitting the grid using the GoldenRatio( ) function to obtain a plurality of sub-grids. At each split, the grid is partitioned into a square and a rectangle. The recursive splitting generates a plurality of squares and a plurality of rectangles. The recursive splitting is terminated upon achieving at least one of two conditions: (a) a last sub-grid of the plurality of sub-grids has a dimension equal to or below a pre-defined size, and (b) the last sub-grid is a square. The method further includes storing (a) the plurality of squares into a first queue, and (b) a plurality of transcoded product images to be advertised in a second queue. The plurality of squares are stored in decreasing order of their dimensions per recursion. Each recursion results in a set of squares wherein a first square of the set is bigger than the subsequent squares in the set. And the plurality of transcoded product images are stored based on preference/priority assigned to each product to be advertised. The method further includes iteratively obtaining a plurality of aesthetic spaces created by placing at least one transcoded product image of the plurality of transcoded product images to be advertised on at least one square of the plurality of squares. Each square of the plurality of squares in the first queue and each transcoded product image of the plurality of transcoded product images in the second queue are called in a sequential manner to form the aesthetic space in a plurality of steps. In a first step of the plurality of steps, a complementary color scheme to a color palette of a current transcoded product image of the plurality of transcoded product images in the second queue is generated. In a second step of the plurality of steps, the complementary color scheme with a specified transparency level is applied to a current square of the plurality of squares in the first queue. And, in a third step of the plurality of steps, the current transcoded product image among the plurality of transcoded product images in the second queue is placed in the current square of the plurality of squares in the first queue, wherein the complementary color scheme with the specified transparency level is employed to the current square. The method further includes embedding one or more audio streams, each having a plurality of harmonic frequencies to each aesthetic space of the plurality of aesthetic spaces. The one or more audio streams are played upon tapping each aesthetic space of the plurality of aesthetic spaces on the display screen, and at each tapping, an aural feedback is provided to the user when the mobile device of the user is in an audio-enabled mode. Similarly, each tapping generates a haptic feedback to the user when the mobile device is in haptic-enabled mode. The haptic feedback is communicated to the user via haptic actuators. The haptic-enabled mode utilizes the assembly of the one or more haptic sensors and the one or more haptic actuators of the mobile device to sense the tapping action caused by the user. The method further includes placing the plurality of aesthetic spaces to the mobile device as an overlay to a video file of a fixed duration. The video file of the fixed duration is transmitted prior to a placement of the overlay. The method further includes identifying a plurality of eye-gaze hotspots of the grid. The eye-gaze spots are identified by using one or more eye-tracking sensors by utilizing a front camera or an IR camera of the mobile device. The system exploits SOTA methods through device application programming interfaces (APIs). The plurality of eye-gaze hotspots are mapped with the plurality of aesthetic spaces generated within the grid, using the recursive splitting to calculate a shift difference. The shift difference is a difference between a centroid of the hotspot and a centroid of the part of the display screen falling within the golden ratio dimensions, and wherein a value of the shift difference is optimized to a threshold value. The method further includes dynamically aligning the plurality of aesthetic spaces generated within the grid to the eye-gaze hotspots of the grid, based on the shift difference, to create an individualistic personalization of the grid. Therefore, the golden ratio derived grid functions as an aesthetic nudge grid that comprises the plurality of aesthetic spaces capable of creating sub-conscious influence for an enhanced user experience.

In another aspect, a system for creating aesthetic spaces for placing a plurality of advertisement products within a display screen of a mobile device is provided. The system includes at least one memory storing programmed instructions; one or more Input/Output (I/O) interfaces; and one or more hardware processors, an aesthetic product placement module, operatively coupled to a corresponding at least one memory, wherein the system is configured to receive (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive splitting in one of (a) a clock-wise direction, and (b) an anti-clockwise direction. The system is configured to obtain a plurality of golden ratio dimensions associated with the plurality of dimensions of the display screen from a look-up table. A part of the display screen falling within the golden ratio dimensions forms a grid. Rest of the space of the display screen is not considered for further processing. The system is configured to recursively split the grid using the GoldenRatio( ) function to obtain a plurality of sub-grids. At each split, the grid is partitioned into a square and a rectangle. The recursive splitting generates a plurality of squares and a plurality of rectangles. The recursive splitting is terminated upon achieving at least one of two conditions: (a) a last sub-grid of the plurality of sub-grids has a dimension equal to or below a pre-defined size, and (b) the last sub-grid is a square. The system is configured to store (a) the plurality of squares in a first queue, and (b) a plurality of transcoded product images to be advertised in a second queue. The plurality of squares are stored in decreasing order of their dimensions per recursion. Each recursion results in a set of squares wherein a first square of the set is bigger than the subsequent squares in the set. And the plurality of transcoded product images are stored based on preference/priority assigned to each product to be advertised. The system is configured to iteratively obtain a plurality of aesthetic spaces created by placing at least one transcoded product image of the plurality of transcoded product images to be advertised on at least one square of the plurality of squares. Each square of the plurality of squares in the first queue and each transcoded product image of the plurality of transcoded product images in the second queue are called in a sequential manner to form the aesthetic space in a plurality of steps. In a first step of the plurality of steps, a complementary color scheme to a color palette of a current transcoded product image of the plurality of transcoded product images in the second queue is generated. In a second step of the plurality of steps, the complementary color scheme with a specified transparency level is applied to a current square of the plurality of squares in the first queue. And, in a third step of the plurality of steps, the current transcoded product image among the plurality of transcoded product images in the second queue is placed in the current square of the plurality of squares in the first queue, wherein the complementary color scheme with the specified transparency level is employed to the current square. The system is configured to embed one or more audio streams, each having a plurality of harmonic frequencies to each aesthetic space of the plurality of aesthetic spaces. The one or more audio streams are played upon tapping each aesthetic space of the plurality of aesthetic spaces on the display screen, and at each tapping, an aural feedback is provided to the user when the mobile device of the user is in an audio-enabled mode. The haptic feedback is communicated to the user via haptic actuators. The haptic-enabled mode utilizes the assembly of one or more haptic sensors and one or more haptic actuators of the mobile device to sense the tapping action caused by the user. Similarly, each tapping generates a haptic feedback to the user when the mobile device is in haptic-enabled mode. The system is configured to place the plurality of aesthetic spaces to the mobile device as an overlay to a video file of a fixed duration. The video file of the fixed duration is transmitted prior to a placement of the overlay. The system is configured to identify a plurality of eye-gaze hotspots of the grid. The eye-gaze spots are identified by using one or more eye-tracking sensors by utilizing a front camera or an IR camera of the mobile device. The system exploits SOTA methods through device application programming interfaces (APIs). The plurality of eye-gaze hotspots are mapped with the plurality of aesthetic spaces generated within the grid, using the recursive splitting to calculate a shift difference. The shift difference is a difference between a centroid of the hotspot and a centroid of the part of the display screen falling within the golden ratio dimensions, and wherein a value of the shift difference is optimized to a threshold value. The system is configured to dynamically align the plurality of aesthetic spaces generated within the grid to the eye-gaze hotspots of the grid, based on the shift difference, to create an individualistic personalization of the grid. Therefore, the golden ratio derived grid functions as an aesthetic nudge grid that comprises the plurality of aesthetic spaces capable of creating sub-conscious influence for an enhanced user experience.

In yet another aspect, a computer program product including a non-transitory computer-readable medium embodied therein a computer program for placing a plurality of advertisement products within a display screen of a mobile device is provided. The computer readable program, when executed on a computing device, causes the computing device to receive, via one or more hardware processors, (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive splitting in one of (a) a clock-wise direction, and (b) an anti-clockwise direction. The computer readable program, when executed on a computing device, causes the computing device to obtain, via one or more hardware processors, a plurality of golden ratio dimensions associated with the plurality of dimensions of the display screen from a look-up table. A part of the display screen falling within the golden ratio dimensions forms a grid. Rest of the space of the display screen is not considered for further processing. The computer readable program, when executed on a computing device, causes the computing device to recursively split, via one or more hardware processors, the grid using the GoldenRatio( ) function to obtain a plurality of sub-grids. At each split, the grid is partitioned into a square and a rectangle. The recursive splitting generates a plurality of squares and a plurality of rectangles. The recursive splitting is terminated upon achieving at least one of two conditions: (a) a last sub-grid of the plurality of sub-grids has a dimension equal to or below a pre-defined size, and (b) the last sub-grid is a square. The computer readable program, when executed on a computing device, causes the computing device to store, via one or more hardware processors, (a) the plurality of squares in a first queue, and (b) a plurality of transcoded product images to be advertised in a second queue. The plurality of squares are stored in decreasing order of their dimensions per recursion. Each recursion results in a set of squares wherein a first square of the set is bigger than the subsequent squares in the set. And the plurality of transcoded product images are stored based on preference/priority assigned to each product to be advertised. The computer readable program, when executed on a computing device, causes the computing device to iteratively obtain, via one or more hardware processors, a plurality of aesthetic spaces created by placing at least one transcoded product image of the plurality of transcoded product images to be advertised on at least one square of the plurality of squares. Each square of the plurality of squares in the first queue and each transcoded product image of the plurality of transcoded product images in the second queue are called in a sequential manner to form the aesthetic space in a plurality of steps. In a first step of the plurality of steps, a complementary color scheme to a color palette of a current transcoded product image of the plurality of transcoded product images in the second queue is generated. In a second step of the plurality of steps, the complementary color scheme with a specified transparency level is applied to a current square of the plurality of squares in the first queue. And, in a third step of the plurality of steps, the current transcoded product image among the plurality of transcoded product images in the second queue is placed in the current square of the plurality of squares in the first queue, wherein the complementary color scheme with the specified transparency level is employed to the current square. The computer readable program, when executed on a computing device, causes the computing device to embed, via one or more hardware processors, one or more audio streams, each having a plurality of harmonic frequencies to each aesthetic space of the plurality of aesthetic spaces. The one or more audio streams are played upon tapping each aesthetic space of the plurality of aesthetic spaces on the display screen, and at each tapping, an aural feedback is provided to the user when the mobile device of the user is in an audio-enabled mode. Similarly, each tapping generates a haptic feedback to the user when the mobile device is in haptic-enabled mode. The haptic feedback is communicated to the user via haptic actuators. The haptic-enabled mode utilizes an assembly of one or more haptic sensors of the mobile device to sense the tapping action caused by the user. The computer readable program, when executed on a computing device, causes the computing device to place, via one or more hardware processors, the plurality of aesthetic spaces to the mobile device as an overlay to a video file of a fixed duration. The video file of the fixed duration is transmitted prior to a placement of the overlay. The computer readable program, when executed on a computing device, causes the computing device to identify, via one or more hardware processors, a plurality of eye-gaze hotspots of the grid. The eye-gaze spots are identified by using one or more eye-tracking sensors by utilizing a front camera or an IR camera of the mobile device. The system exploits SOTA methods through device application programming interfaces (APIs). The plurality of eye-gaze hotspots are mapped with the plurality of aesthetic spaces generated within the grid, using the recursive splitting to calculate a shift difference. The shift difference is a difference between a centroid of the hotspot and a centroid of the part of the display screen falling within the golden ratio dimensions, and wherein a value of the shift difference is optimized to a threshold value. The computer readable program, when executed on a computing device, causes the computing device to dynamically align, via one or more hardware processors, the plurality of aesthetic spaces generated within the grid to the eye-gaze hotspots of the grid, based on the shift difference, to create an individualistic personalization of the grid. Therefore, the golden ratio derived grid functions as an aesthetic nudge grid that comprises the plurality of aesthetic spaces capable of creating sub-conscious influence for an enhanced user experience.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
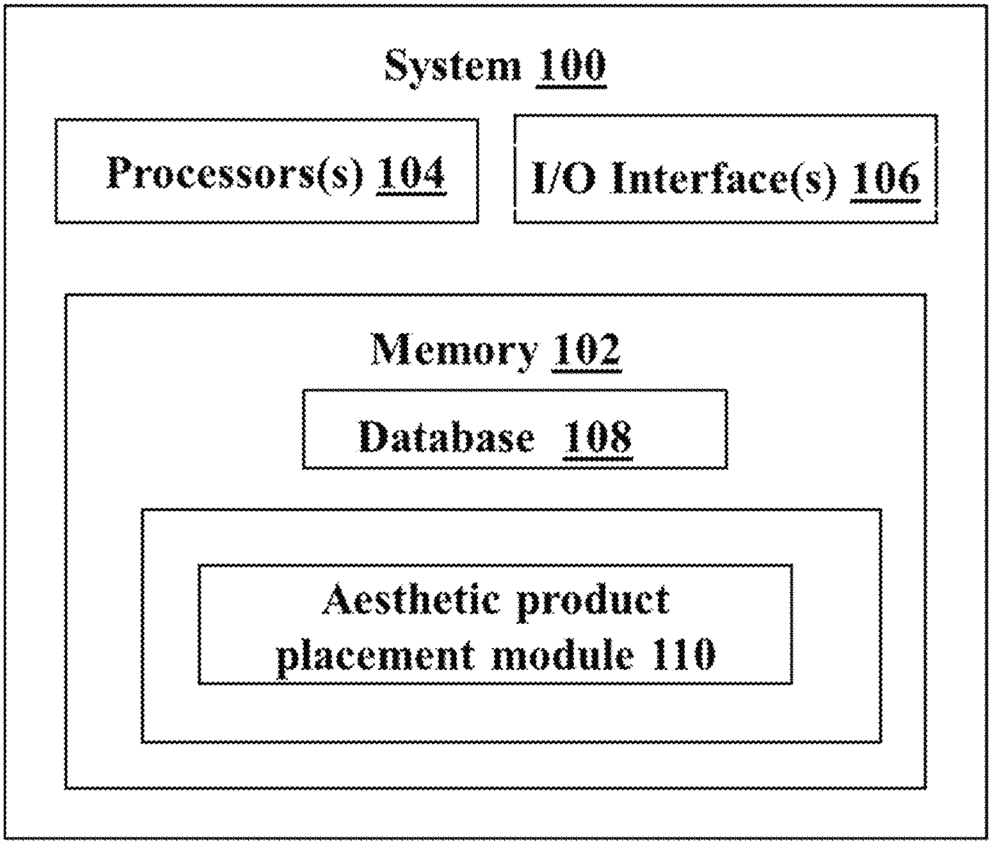
FIG. 1 illustrates an exemplary block diagram of a system 100 for aesthetic positioning of advertisement products, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Placement of a product greatly depends on its impact of nudging the viewer that can create a sub-conscious and thus results in a better user experience. The user experience is a critical factor in the success of products and services. Within the realm of the user experience, the aesthetic-usability effect stands out as a vital principle that can significantly enhance the user experience. The present disclosure relates to aesthetic positioning of the products within the mobile display screen that can create an impact on the target audience in relation to awareness, associations, attitudes, and attachment/activity. In the present disclosure, the aesthetic placement of the product is therefore seen with respect to the strength it has in influencing one or more of the above elements. To navigate through various unsolved obscurities like not knowing where to place the products so that they are aesthetically pleasing, and knowing what is the upper bound on the total number of products which can be placed, and how much screen space they should occupy with respect to the total screen space, and wherein the layout of the screen should they be placed within bounding rectangular spaces, what should be their relative order of sizing of the images/pixels space. Further, identifying dynamic choices of colors which should be used as a backdrop/background color for the products to be in a the visual space of the smartphone with the constraint that these colors should draw the attention of the user and also be aesthetic according to color theory. Moreover, creating harmonies which can be synthesized by the machine when a particular view-port/screen area is tapped by the user.

Referring now to the drawings, and more particularly to FIG. 1 through FIG. 7, where similar reference characters denote corresponding features consistently throughout the figures, there are shown preferred embodiments, and these embodiments are described in the context of the following exemplary system and/or method.

FIG. 1 illustrates an exemplary block diagram of a system 100 for aesthetic positioning of advertisement products, according to some embodiments of the present disclosure.

In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, system 100 can be implemented in a variety of computing systems, such as, laptop computers, notebooks, hand-held devices, workstations, mainframe computers, servers, a network cloud, and the like. The I/O interface(s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) 106 can include one or more ports for connecting a number of devices such as the user terminals enabling user to communicate with system via the chat bot UI or enabling devices to connect with one another or to another server. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, memory 102 may include a database or repository. Memory 102 may comprise information pertaining to input(s)/output(s) of each step performed by the processor(s) 104 of the system 100 and methods of the present disclosure. In an embodiment, the database may be external (not shown) to the system 100 and coupled via the I/O interface 106. The memory 102 includes an aesthetic product placement module 110. The aesthetic product placement module 110 creates aesthetic spaces within a display screen of the mobile device based on dimensions of the display screen of the mobile device, and a current orientation of the mobile device held by a user. Based on the dimensions of the display screen, corresponding golden ratio dimensions are derived to obtain a grid. The aesthetic spaces are created by recursive splitting of the grid using a GoldenRatio( ) function to obtain a plurality of sub-grids, wherein at each split, the grid is partitioned into a square and a rectangle. The plurality of squares generated by the recursive splitting are considered as the aesthetic spaces for the product placement. A plurality of transcoded product images to be advertised are placed in the plurality of squares generated by the recursive splitting. The aesthetic positioning is further enhanced by applying color schemes to each squares which is complementary to colors of the transcoded product images. The plurality of aesthetic spaces are created as an overlay to one or more video file advertising one or more products or services. The aesthetic positioning is further supplemented by embedding one or more audio streams, each having a plurality of harmonic frequencies to each aesthetic spaces. The one or more audio streams embedded to the plurality of aesthetic spaces create an aural experience to the user when the mobile device is in the audio-enabled mode. Similarly, tapping of each aesthetic space on the display screen creates a tactile experience to the user when the mobile device is in the haptic-enabled mode.

The haptic-enabled mode utilizes the assembly of the one or more haptic sensors and the one or more haptic actuators. The aural experience and the tactile experience collectively contributes to the aesthetic experience of the user. The memory 102 further includes a plurality of modules (not shown here) comprises programs or coded instructions that supplement applications or functions performed by the system 100 for executing different steps involved in the data rate prediction and prioritization. The plurality of modules, amongst other things, can include routines, programs, objects, components, and data structures, which perform particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by one or more hardware processors 104, or by a combination thereof. The plurality of modules can include various sub-modules (not shown).

Figure 2A:
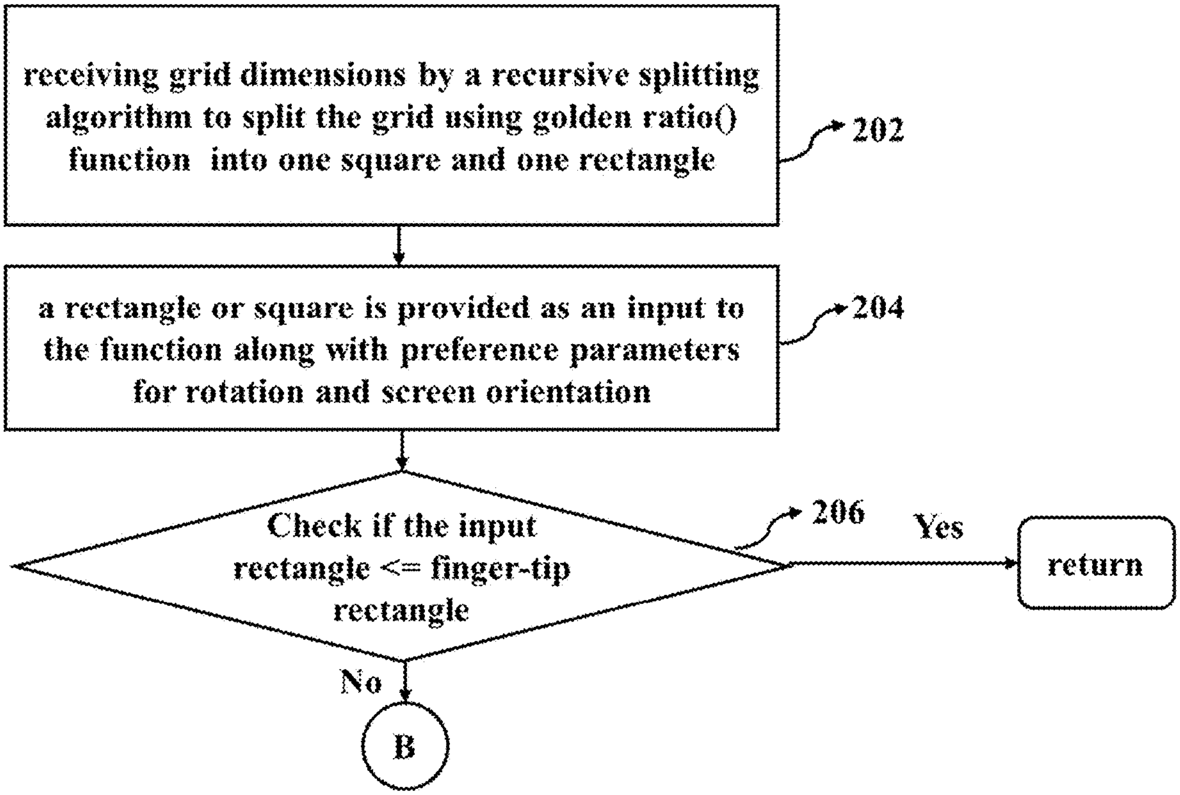
FIGS. 2A, 2B and 2C are flow diagrams illustrating creation of an aesthetical positions as product placement regions within a display screen of a mobile device, according to some embodiments of the present disclosure.
Figure 2B:
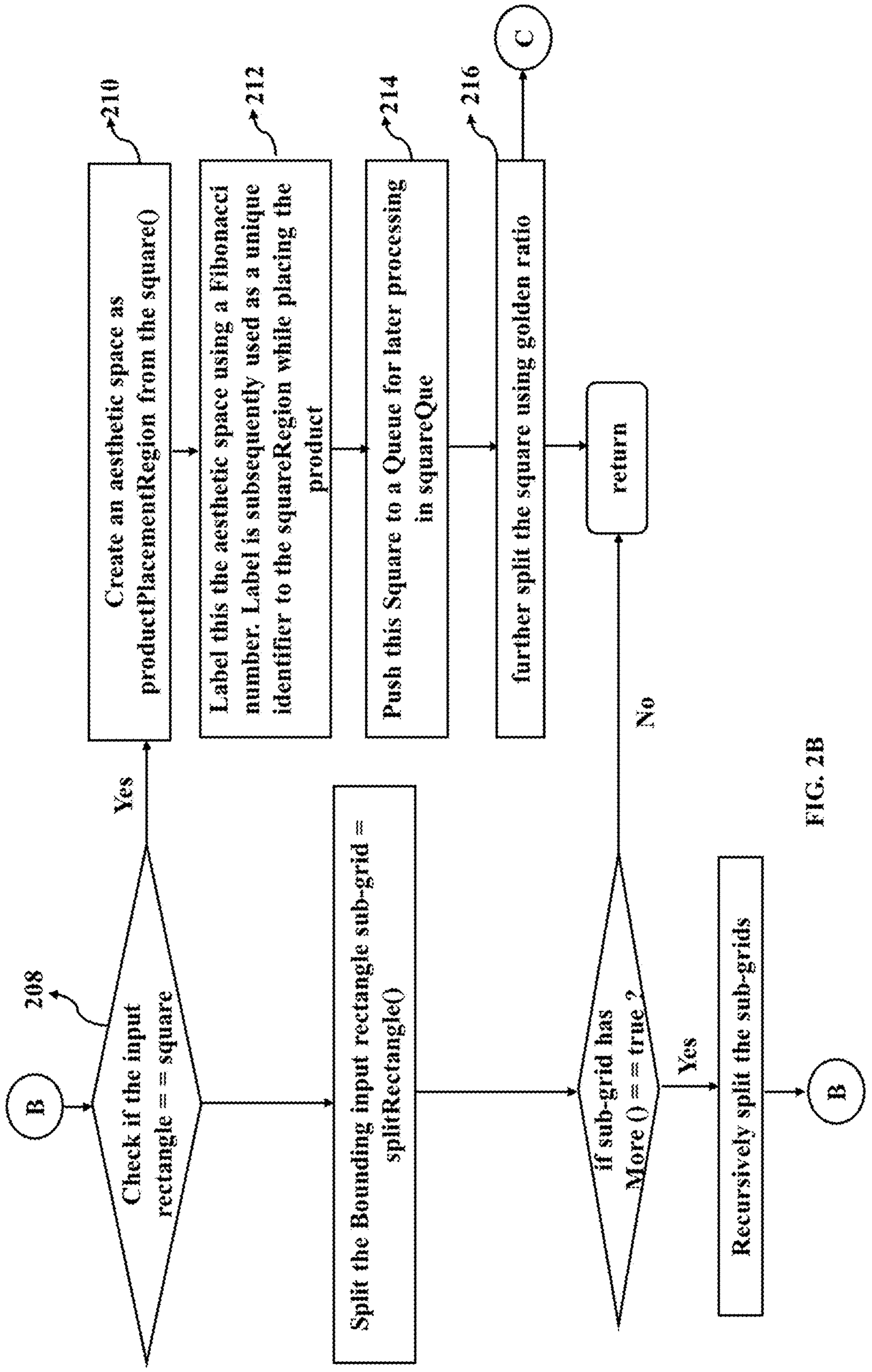
Figure 2C:
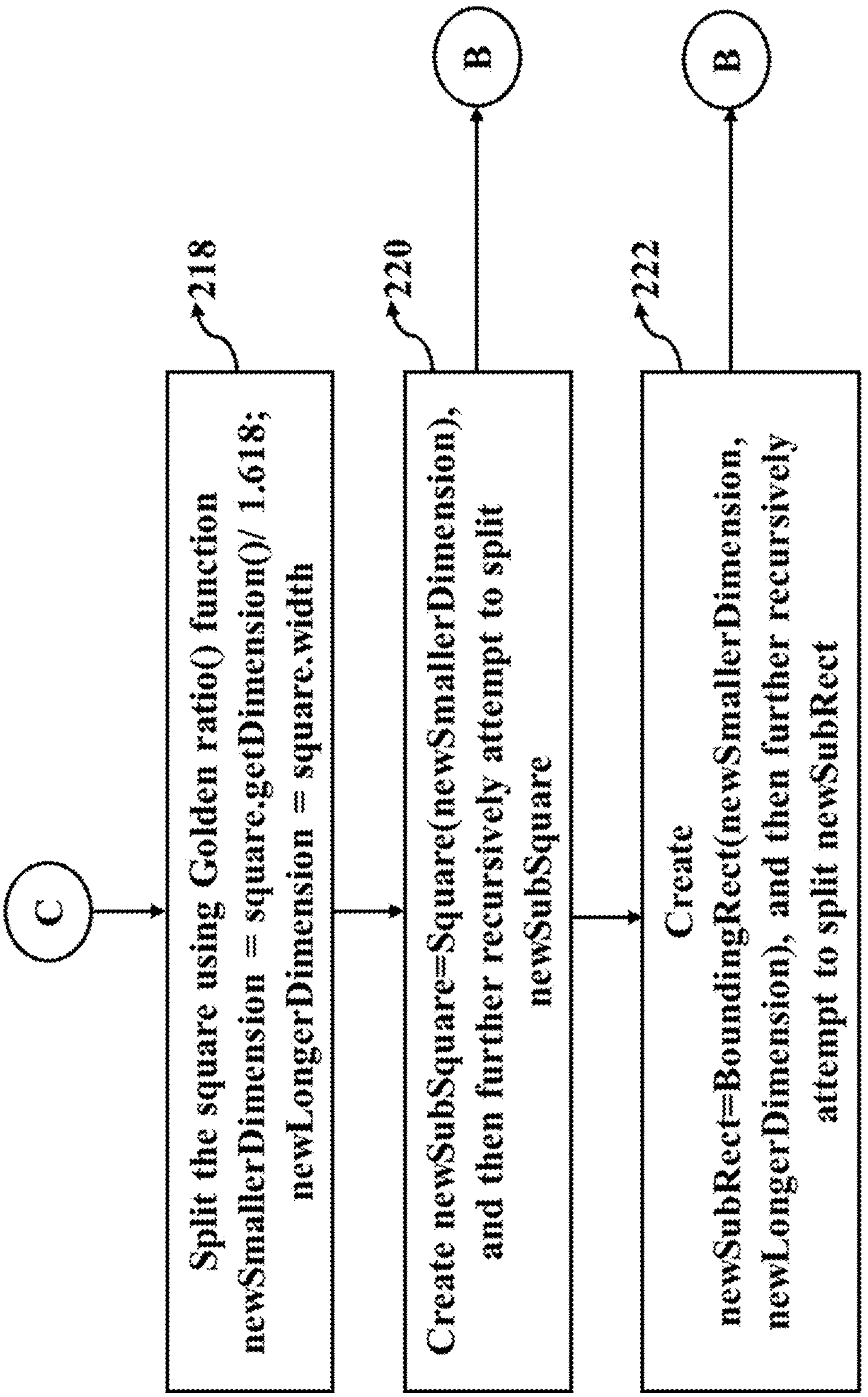

FIGS. 2A, 2B and 2C are flow diagrams illustrating creation of an aesthetical positions as product placement regions within a display screen of a mobile device, according to some embodiments of the present disclosure.

As illustrated in FIGS. 2A, 2B and 2C, at 202 a plurality of grid dimensions of a grid are provided to a recursive splitting algorithm that splits the grid using a golden ratio( ) function. The grid is split into a square and a rectangle. The splitting is performed outside-in-order such that a first split results into a square that is largest among all the squares obtained via subsequent splits. And a rectangle that is largest among all the rectangles obtained via subsequent splits. At 204, the resultant rectangle or the square is provided as an input to the golden ratio( ) function along with one or more preference parameters for rotation and screen orientation. The preference parameters are dynamically updated based on current handling of the mobile device by the user. After each splitting, the system 100 checks a termination condition to halt the splitting. At 206, the system 100 checks if the input rectangle is smaller or equal to finger-tip rectangle. If this condition is satisfied, the splitting terminates. If condition does not satisfy then at 208, the system 100 checks if it is a square. At 210, the squares are considered for aesthetic space creation and thus identified as a product placement region. The resultant rectangle is further taken for splitting into one more square and one more rectangle. This continues recursively, each time splitting the rectangle into a square and a rectangle until termination condition is satisfied. At 212, a plurality of squares created by each split are stored in a first queue (also called as SquareQue) and are labelled with a unique identifier with respect to its placement within the grid. Based on the unique identifier, the plurality of squares are arranged in the first queue. Since the recursive splitting is performed outside-in-order, the square having larger dimensions is stored first in the first queue followed by storing the plurality of squares having their dimensions in decreasing order. At 214, the largest square stored in the first queue is called first to create the aesthetic space. The plurality of aesthetic spaces are created by the recursive splitting based on golden ratio( ) function. Once the rectangles are split recursively to the rectangle and the square, another round of splitting begins at 216 by splitting the largest square. At 218, the square is split using the Golden ratio( ) function by dividing the square with 1.618. As the golden ratio is a special number which is approximately equal to 1.618. Dividing the square with 1.618 results in a one rectangle with breadth as newSmallerDimension and length as newLongerDimension and one square with length and breadth as newSmallerDimension. At 220, the new square is further split recursively to a new sub-square having further smaller dimensions and a new sub-rectangle having further smaller dimensions. As the new sub-square is formed, the system analyses the termination condition to halt further splitting and sends the plurality of squares obtained at each recursive split in the first queue. This is also called nested recursion. Similarly, at 222, as the new sub-rectangle is formed, the system analyses the termination condition to halt further splitting the plurality of rectangles obtained at each recursive split are segregated apart.

Figure 3A:
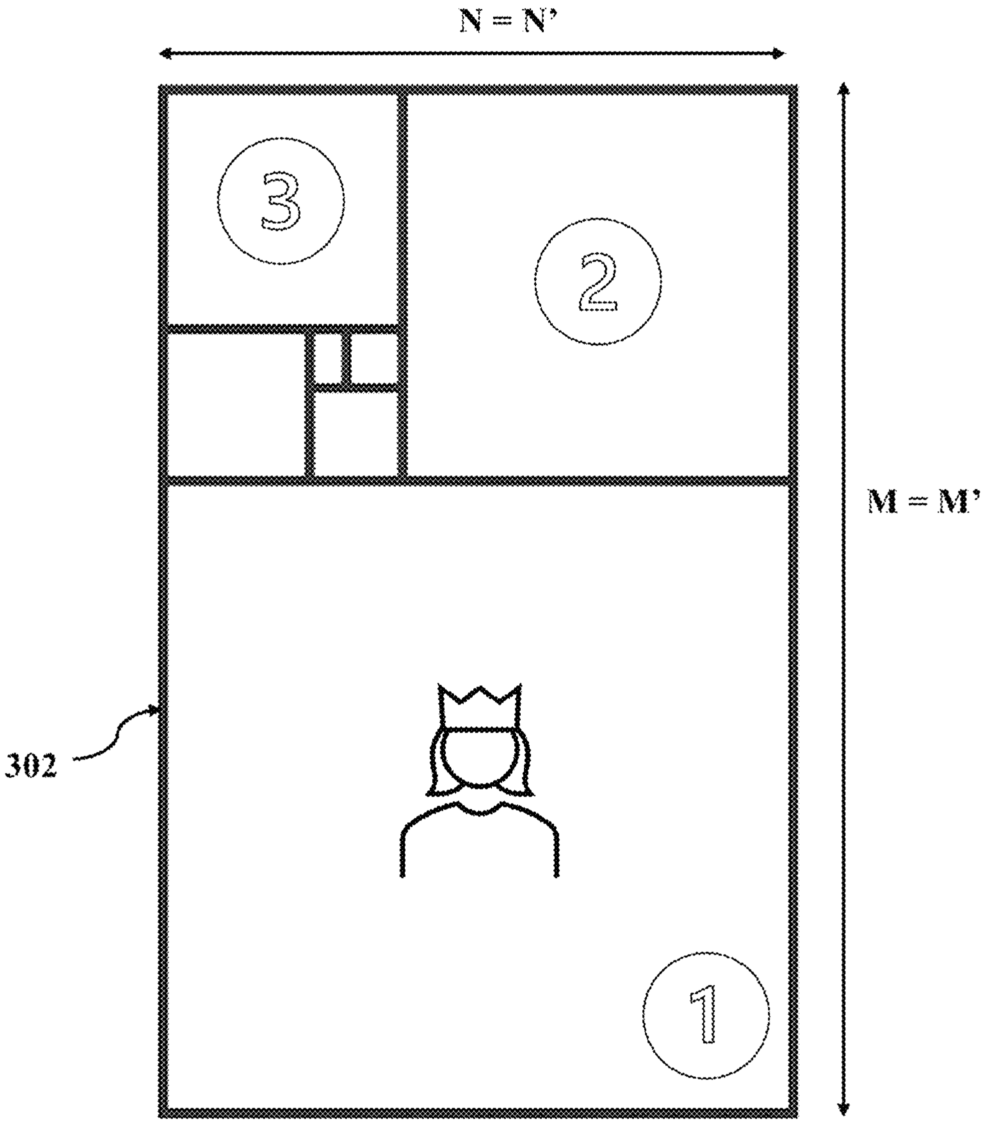
FIGS. 3A and 3B illustrates a plurality of aesthetic spaces within a display screen of a mobile device created by applying a golden ratio splitting, according to some embodiments of the present disclosure.
Figure 3B:
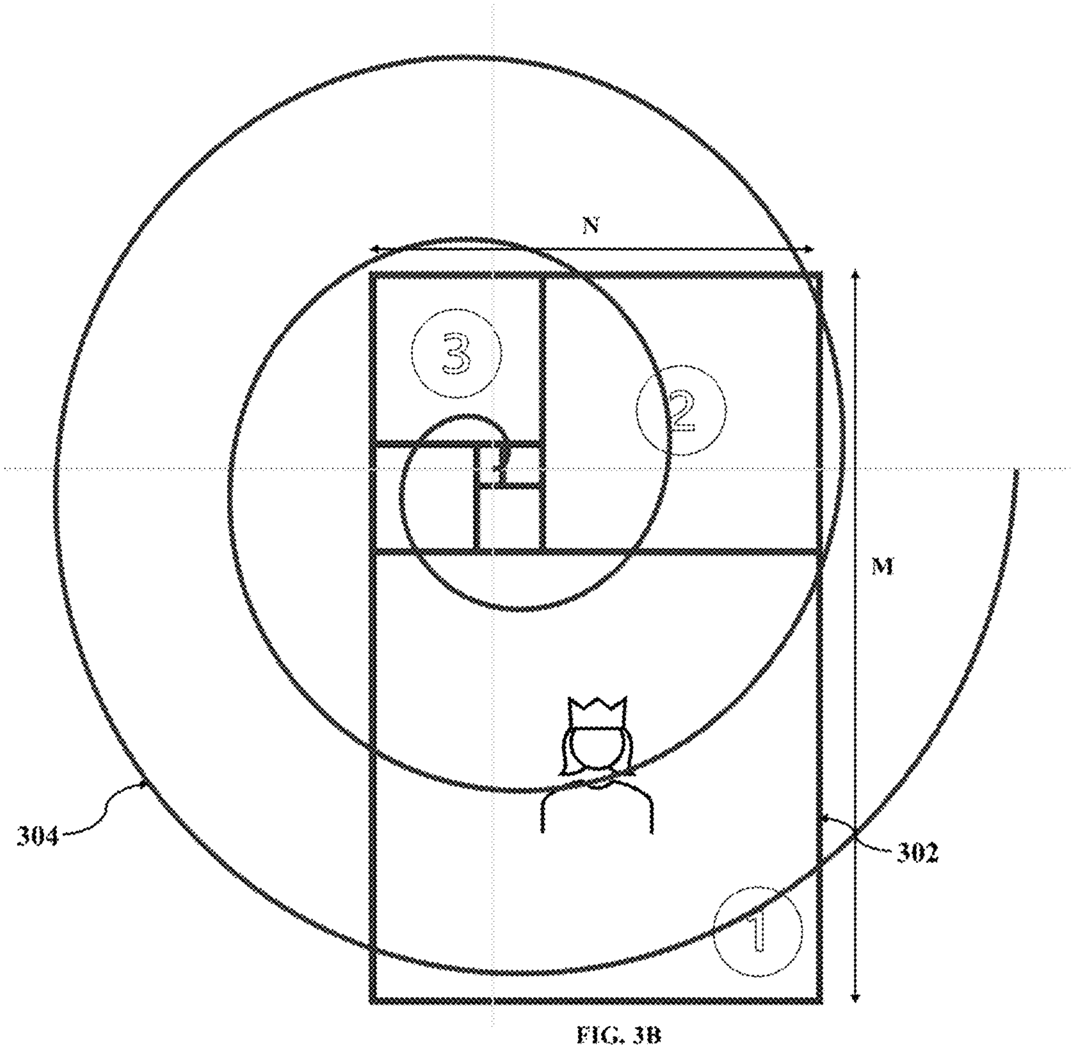

FIGS. 3A and 3B illustrate a plurality of aesthetic spaces within a display screen of a mobile device created by applying a golden ratio splitting, according to some embodiments of the present disclosure.

Figure 4C:
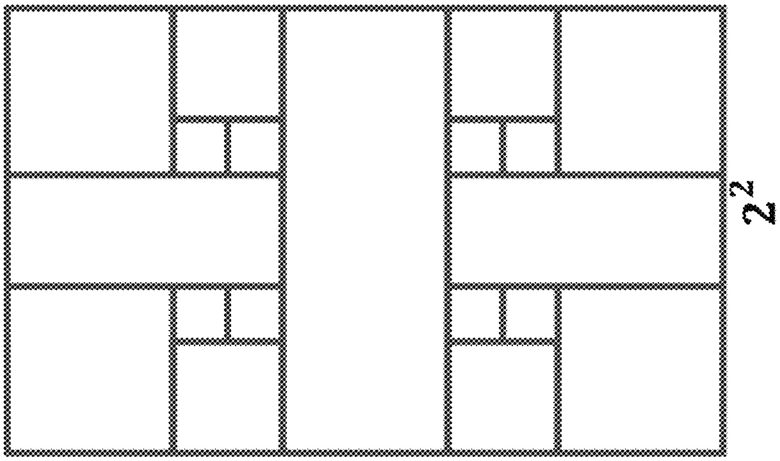
FIGS. 4A, 4B, 4C and 4D depicts a recursive splitting for generation of squares based on golden ratio, according to some embodiments of the present disclosure.
Figure 4B:
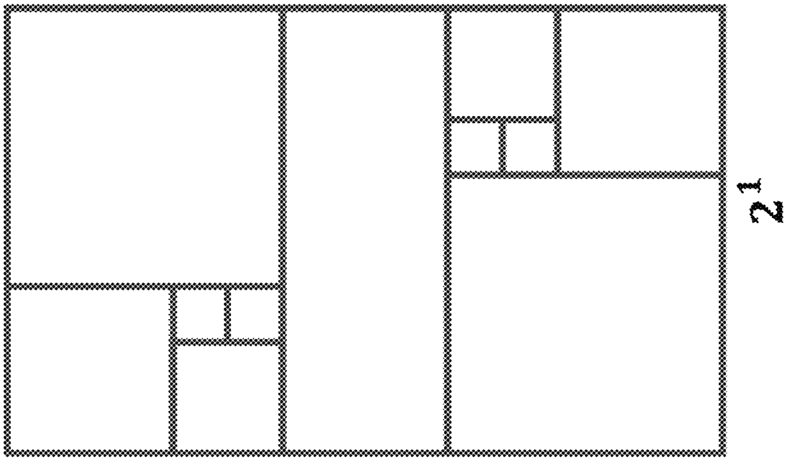
Figure 4A:
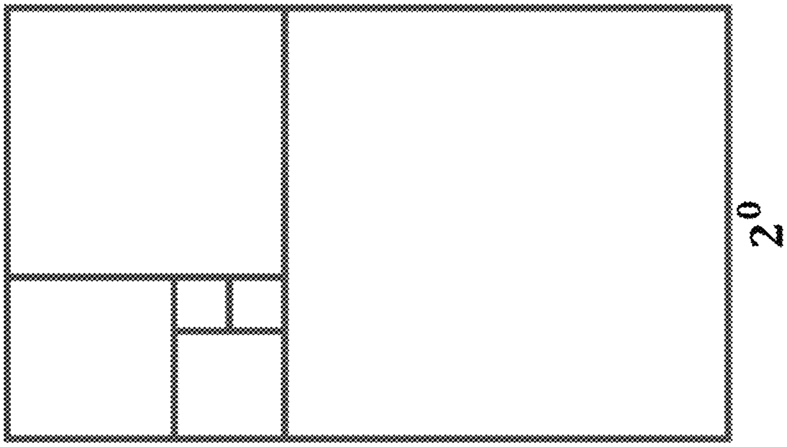
Figure 4D:
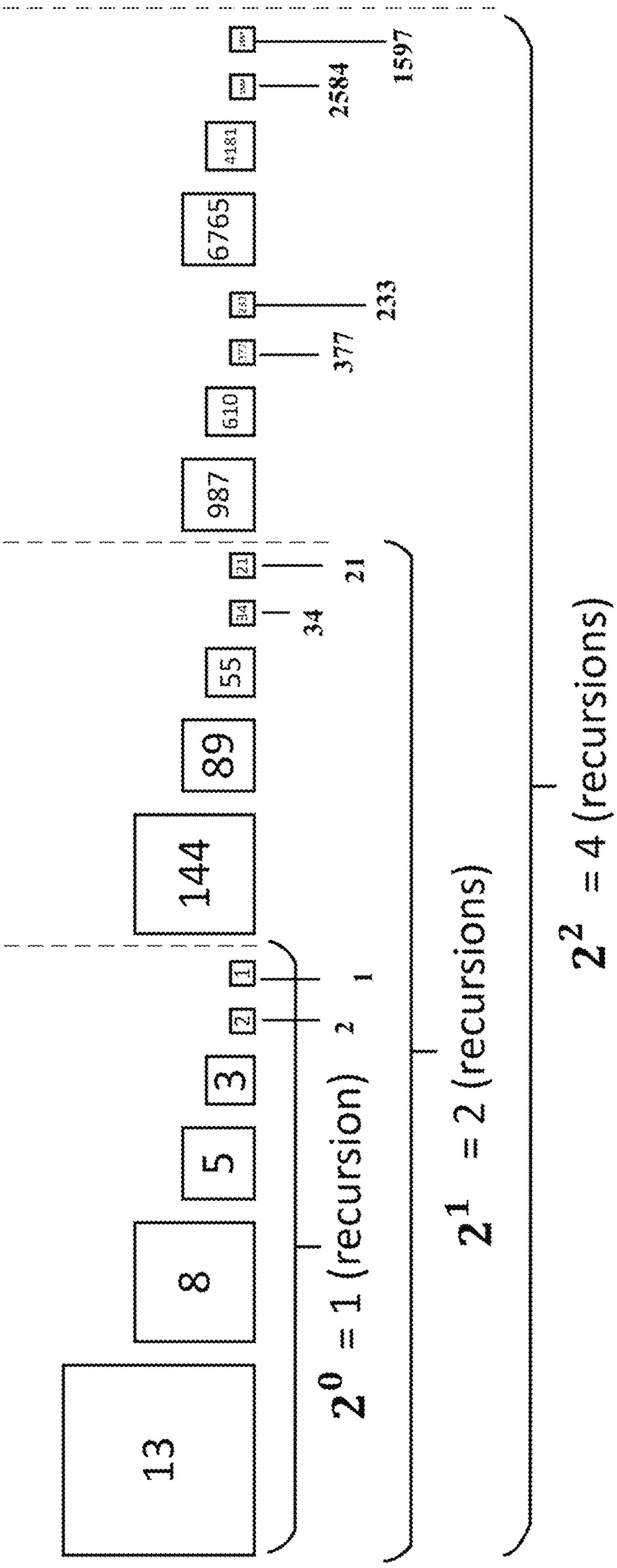

As illustrated in FIG. 3A, the plurality of aesthetic spaces within a display screen of a mobile device are identified via recursive splitting. The recursive splitting utilizes golden ratio dimensions. Consider, M×N representing dimensions of a display screen 302 of a mobile phone. The golden ratio dimensions M'×N' corresponding to the display screen dimensions M×N are obtained by a look-up table. The golden ratio is a ratio between two numbers that equals approximately 1.618. M is the height, and N is the width of the display screen. The smallest dimension of the display screen is that of a pixel a×b. Thus, the entire space is said to be made up of M×N pixels. The golden ratio dimensions are dynamically updated by a bootstrap code upon first launch of an application on the phone by considering the dimensions of the mobile phone device. As illustrated in FIG. 3B, for the aesthetic partitioning of the display screen 302, a golden ratio is applied. A golden spiral 304 is approximated by first starting with a rectangle for which the ratio between its length and width is the golden ratio. The resultant rectangle is then partitioned into a square and a similar rectangle and the same rectangle is then split into a smaller rectangle and a smaller square. These three splitting results into three squares represented as 1, 2 and 3 and are considered as aesthetic positions. The recursive splitting is terminated upon achieving at least one of two conditions: (a) a last sub-grid of the plurality of sub-grids has a dimension equal to or below a pre-defined size, and (b) the last sub-grid is a square, and wherein the recursive splitting generates a plurality of squares and a plurality of rectangles. As the M×N space translated in terms of the golden ratio dimensions M'×N' forms a grid. This translated M'×N' space is recursively representing an equation x^0+x^1=x^2 that represents a division of the grid into spaces which are squares and rectangles following golden ratio proportion of the grid. Thus, if N is the width (and hence the smaller dimension of the rectangle) then a square is constructed having N dimensions, leaves (M-N) as the other dimension that forms a rectangle with (M-N)×(N). This is done recursively. The golden ratio inspired recursive splitting can be initiated in any direction along the rectangle. FIGS. 4A, 4B and 4C represents a plurality of aesthetic positions created as a result of recursive splitting using golden ratio. FIG. 4A results a $2^0$ splitting as a one complete recursion. FIG. 4B results a $2^1$ splitting as a two complete recursions by splitting resulting squares. FIG. 4C results a $2^2$ splitting as a four complete recursions by splitting squares of the resulting squares. A plurality of squares generated at $2^0$ splitting, $2^1$ splitting, and $2^2$ splitting follows a sequential order of dimensions. As shown in FIG. 4D, $2^0$ splitting results into a set of squares of dimensions 13, 8, 5, 3, 2 and 1 arranged in decreasing order of their dimensions. $2^1$ splitting results into a set of squares of dimensions 144, 89, 55, 34 and 21 arranged in decreasing order of their dimensions. And $2^2$ splitting results into a set of squares of dimensions 987, 610, 377, 233 for first two recursions following the decreasing order and 6765, 4181, 2584 and 1597 for next two recursions following the decreasing order.

Figure 5A:
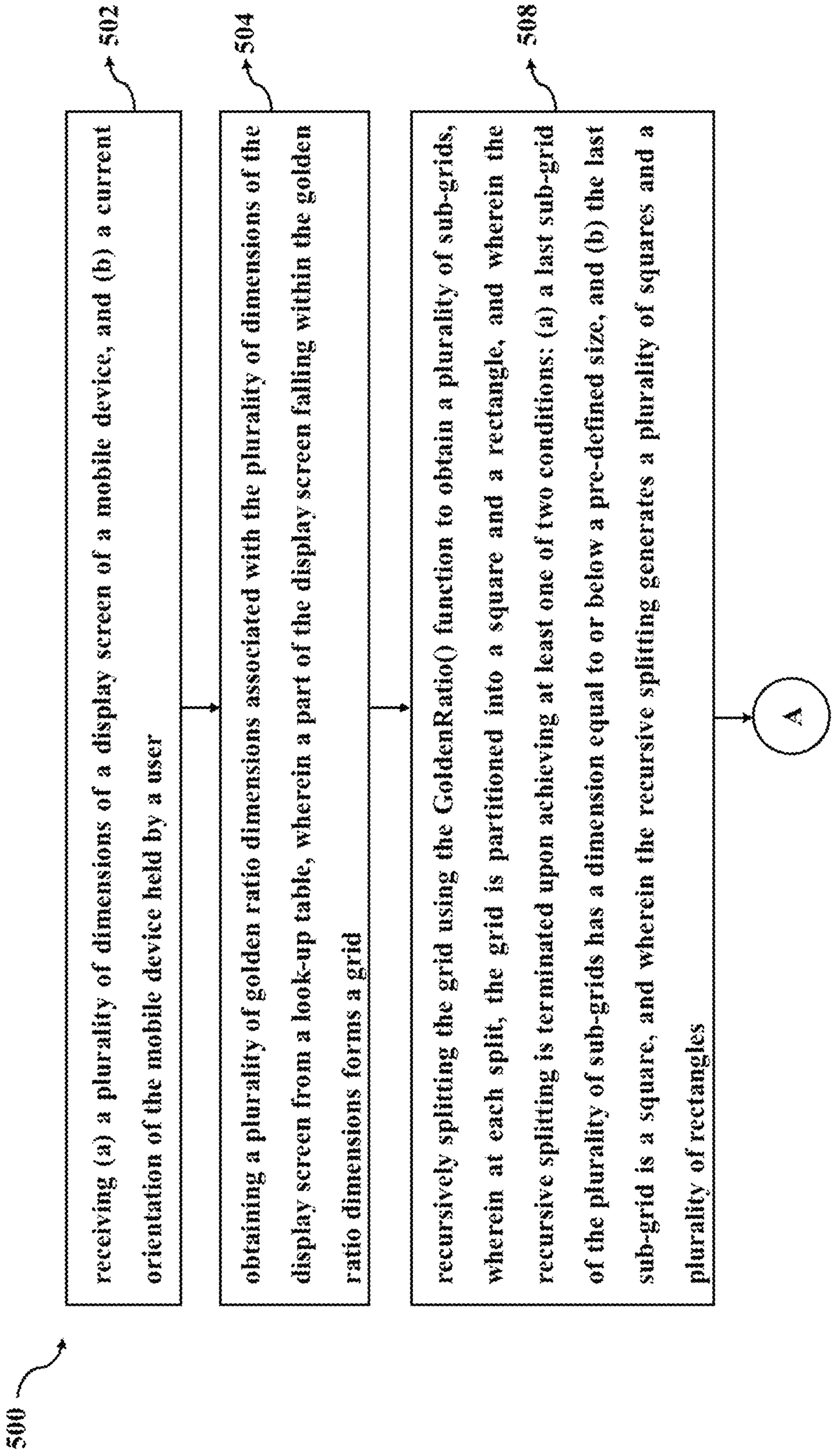
FIGS. 5A, 5B, and 5C depict flow diagrams of an illustrative method for aesthetic positioning of the products for an enhanced aesthetic experience, using the system of FIG. 1, according to some embodiments of the present disclosure.
Figure 5B:
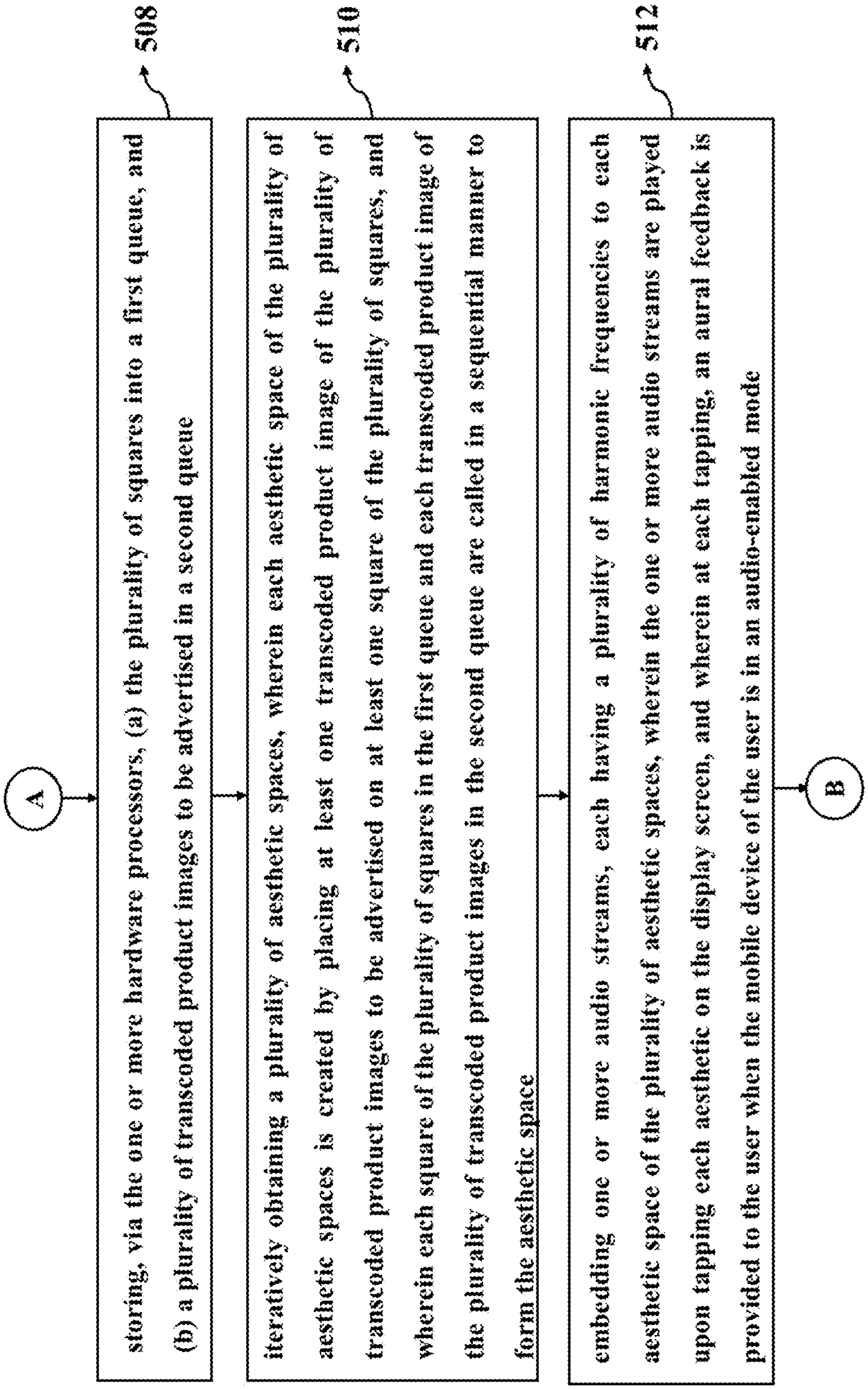
Figure 5C:
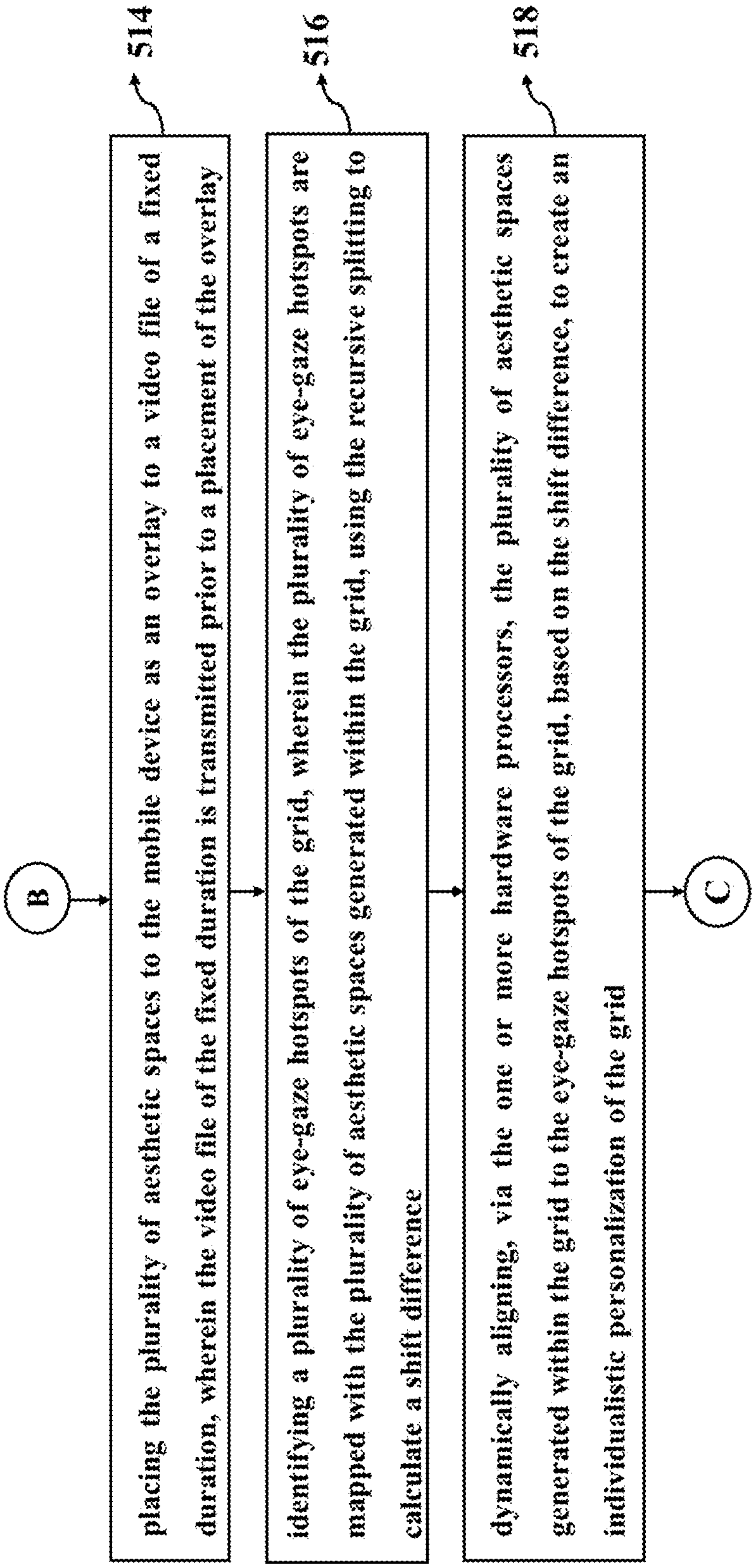

FIGS. 5A, 5B, and 5C depict flow diagrams of an illustrative method for aesthetic positioning of the products for an enhanced aesthetic experience, using the system of FIG. 1, according to some embodiments of the present disclosure.

The steps of method 500 of the present disclosure will now be explained with reference to the components or blocks of the system 100 as depicted in FIG. 1 through FIG. 7. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 502 of the method 500, the one or more hardware processors 104 are configured to receive (a) a plurality of dimensions of a display screen of a mobile device, and (b) a current orientation of the mobile device held by a user. Mostly display screen of the mobile device are in golden ratio but to ensure variations created by various manufacturers of the mobile device, the exact dimensions of the display screen is considered for proper assessment. The golden ratio, a ratio of a rectangle where width is roughly 1.5 times its height, has long been considered the most aesthetically pleasing. The golden ratio has been used to analyze quantities found in design architectures. When used, it is often assumed to create an organic, balanced, and aesthetically pleasing composition, thought to be favored by the human eye. The current orientation of the mobile device is dynamically updated and is represented using a GoldenRatio( ) function to initiate a recursive splitting in one of (a) a clock-wise direction, and (b) an anti-clockwise direction. When the system 100 senses the current orientation of the mobile device as a portrait mode or a landscape mode and accordingly initiate the recursive splitting in any one of the clock-wise direction, or the an anti-clockwise.

At step 504 of the method 500, the one or more hardware processors 104 are configured to obtain a plurality of golden ratio dimensions associated with the plurality of dimensions of the display screen from a look-up table. Based on the dimensions of the display screen, a corresponding golden ratio dimensions are obtained from the look-up table. The part of the display screen falling within the golden ratio dimensions forms a grid. Rest of the part of the display screen is not considered for further calculations. The grid is considered for further processing and creation of aesthetic spaces.

At step 506 of the method 500, the one or more hardware processors 104 are configured to recursively split the grid using the GoldenRatio( ) function to obtain a plurality of sub-grids. At each split of the recursive splitting, the grid is partitioned into a square and a rectangle, and wherein the recursive splitting is terminated upon achieving at least one of two conditions: (a) a last sub-grid of the plurality of sub-grids has a dimension equal to or below a pre-defined size, and (b) the last sub-grid is a square. The recursive splitting results into a plurality of squares and a plurality of rectangles. And the plurality of squares is customizable based on pre-defining the size of the squares sought by the user. The recursive splitting and the creation of square is based on the products to be advertised along with a main video. The squares having aesthetic potential are utilized for product placement and thus number of products to be advertised at one go becomes the termination condition for the recursive splitting.

At step 508 of the method 500, the one or more hardware processors 104 are configured to store (a) the plurality of squares into a first queue, and (b) a plurality of transcoded product images to be advertised in a second queue. Once recursive splitting is terminated, all the rectangles obtained during each split are ignored and all the squares obtained during each split are considered for further processing. All the squares are stored in a first queue. The sequence of the squares in the first queue is based on dimensions of the squares. The largest square in the first queue is stored at the first position and subsequent positions in the first queue are taken by the squares with decreasing order of their size. A plurality of transcoded product images to be advertised are stored in a second queue. The sequence of the transcoded product images in the second queue is specified by the user. The transcoded product image of a product to be advertised prominently will take first position in the second queue. Subsequently, other transcoded product images are arranged based on decreasing order of their preference of advertisement.

At step 510 of the method 500, the one or more hardware processors 104 are configured to iteratively obtain a plurality of aesthetic spaces, wherein each aesthetic space of the plurality of aesthetic spaces is created by placing at least one transcoded product image of the plurality of transcoded product images to be advertised on at least one square of the plurality of squares. Each square of the plurality of squares in the first queue and each transcoded product image of the plurality of transcoded product images in the second queue are called in a sequential manner to form the aesthetic space in a plurality of steps. The sequential manner of calling the current square of the plurality of the squares in the first queue and the current product image of the plurality of product images in the second queue, a second square of the plurality of squares in the first queue and a first product of the plurality of product images in the second queue are called first, and wherein a first square of the plurality of squares in the first queue is kept blank. In the first step of the plurality of steps, a complementary color scheme to a color palette of a current transcoded product image of the plurality of transcoded product images in the second queue is generated. In the second step of the plurality of steps, the complementary color scheme with a specified transparency level is applied to a current square of the plurality of squares in the first queue. And, in a third step of the plurality of steps, the current transcoded product image among the plurality of transcoded product images in the second queue is placed in the current square of the plurality of squares in the first queue, wherein the complementary color scheme with the specified transparency level is employed to the current square. The transcoded product image is picked dynamically based on the resolution of the mobile phone passed by the user to the server. Extraction of the color palette from the transcoded products image is represented as:

$$productColorPalette = ProductColor(p) \tag{1}$$

Using a color theory, a complementary color scheme to the color palette of transcoded product image is chosen to create a transparency background as:

$$complementaryColorPalette = \text{Color}.complementaryColor(productColorPalette) \quad (2)$$

While placing the transcoded product image at ith grid-space, the latest square from the first queue is filled it with complementaryColorPalette. Thus, this creates an overlay which helps isolate product image from the underlaying video frame as:

$$placementSquare = gridspace[i].\text{square} \quad (3)$$

$$placementSquare.\text{fill}(\text{transparency}(complementaryColorPalette, transparencyPercentage))$$

Thus, at ith square in the gridspace, the transcoded product image is placed as:

$$placementSquare.centerAlign(\text{product}) \quad (4)$$

Figure 6:
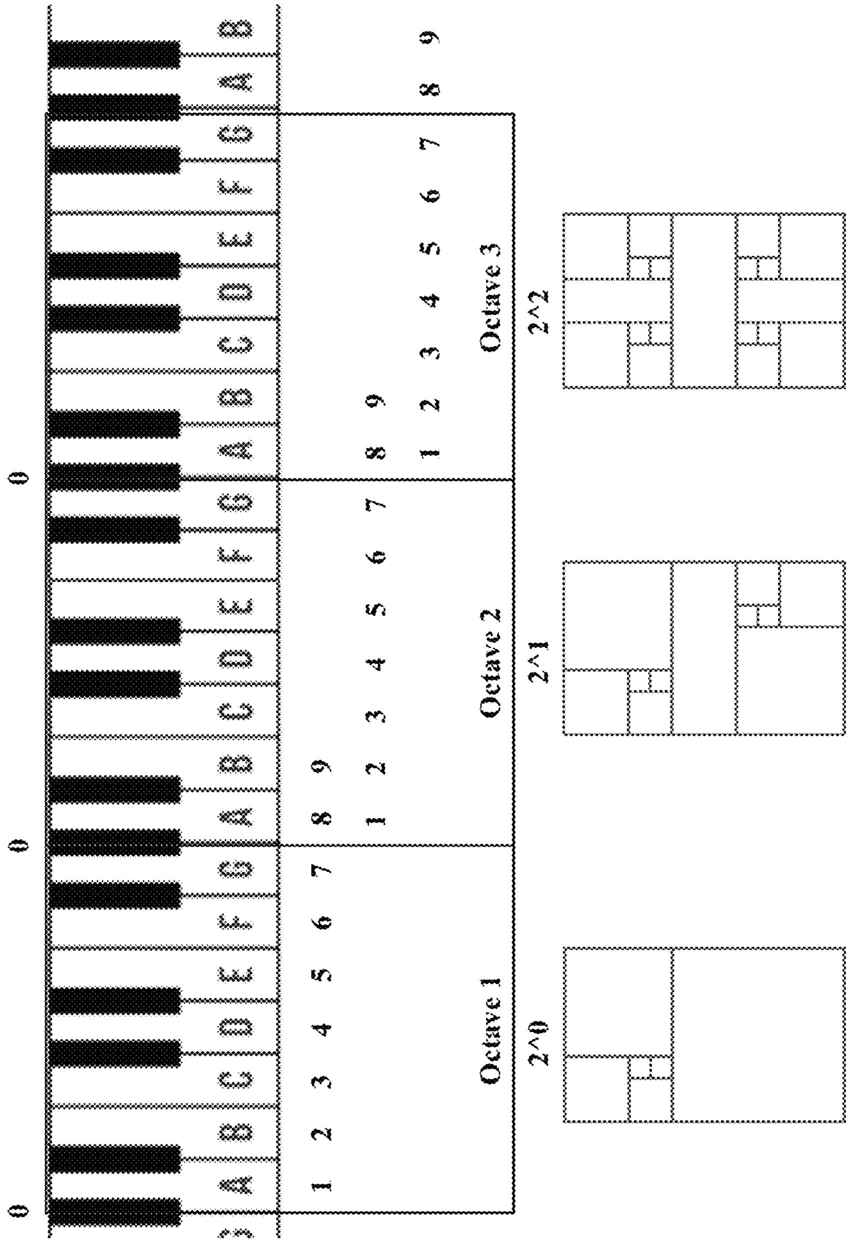
FIG. 6 illustrates labelling of a plurality of aesthetic spaces by Fibonacci series, by the system 100 for aesthetic positioning of advertisement products, according to some embodiments of the present disclosure.
Figure 7:
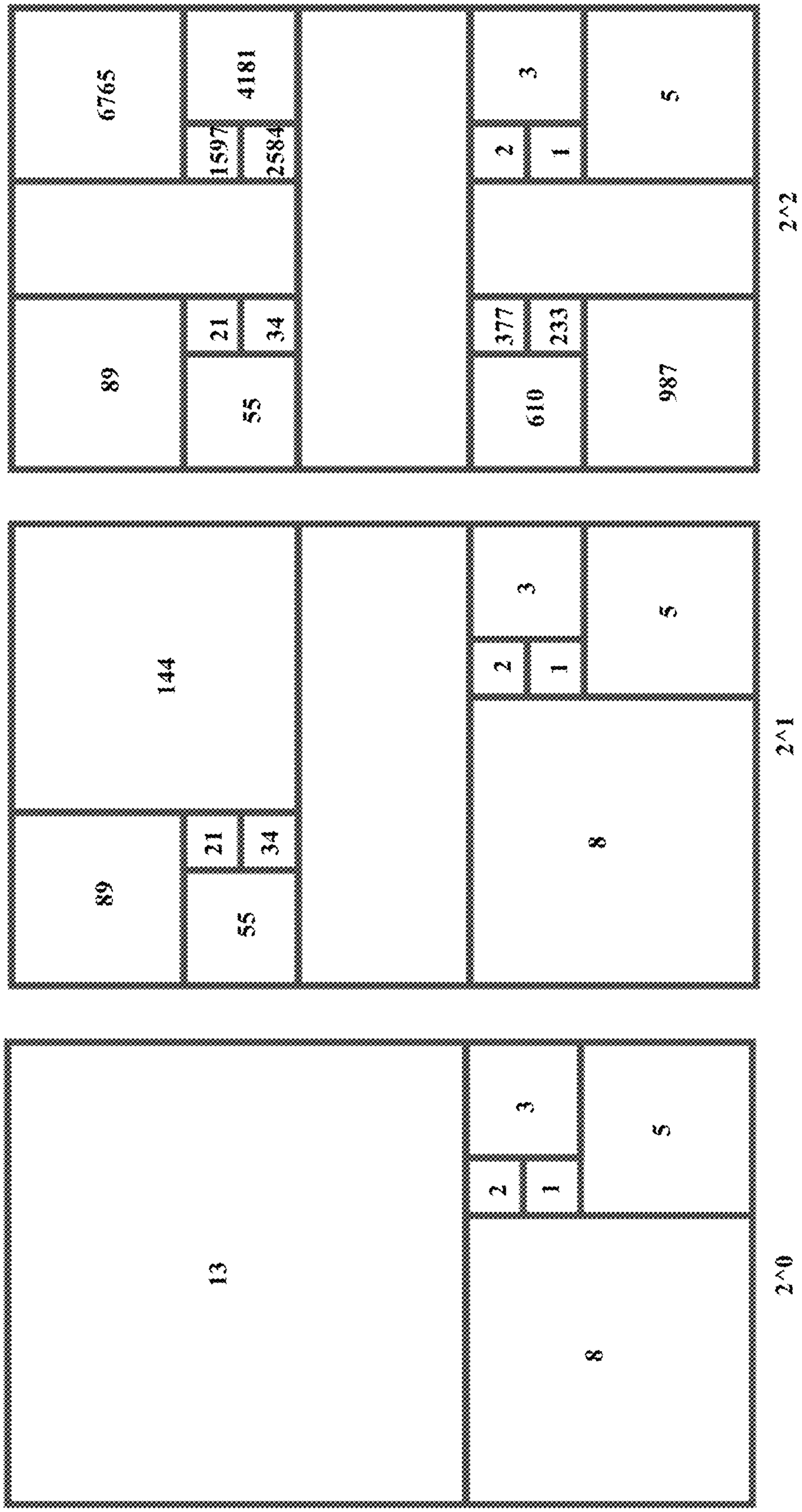
FIG. 7 illustrates placement of Fibonacci series within respective squares obtained as a result of recursive splitting, by the system 100 for aesthetic positioning of advertisement products, according to some embodiments of the present disclosure.

At step 512 of the method 500, the one or more hardware processors 104 are configured to embed one or more audio streams, each having a plurality of harmonic frequencies to each aesthetic space of the plurality of aesthetic spaces. The one or more audio streams are played upon tapping each aesthetic space of the plurality of aesthetic spaces on the display screen, and wherein at each tapping, an aural feedback is provided to the user when the mobile device of the user is in an audio-enabled mode. An assembly of audio sensors and an audio actuators of the mobile phone device are utilized for playing the embedded video files. The embedding of the plurality of harmonic frequencies on the aesthetic spaces dopes the aesthetic experience with the aural experience. When the mobile device is in haptic-enabled mode i.e., silent mode, the system provides a haptic feedback to the user in response to the tapping of each of the aesthetic spaces. The haptic-enabled mode utilizes an assembly of one or more haptic sensors and one or more haptic actuators of the mobile phone device. The haptic feedback is communicated to the user via haptic actuators. The haptic-enabled mode utilizes the assembly of the one or more haptic sensors and the one or more haptic actuators of the mobile device to sense the tapping action caused by the user. Each aesthetic space of the plurality of aesthetic spaces are labelled using a Fibonacci series. As shown in FIG. 6, the aesthetic spaces labelled by the Fibonacci series are categorized in a plurality of octaves. E.g., In a first octave $2^0$, the Fibonacci series is represented as 1, 2, 3, 5, 8 and 13. In a second octave $2^1$, the Fibonacci series is represented 21, 34, 55, 89, and 144. In a third octave $2^2$, the Fibonacci series is represented 233, 377, 610, 987, 1597, 2584, 4181 and 6765. These resulting sequence mapping is translated with a sequence of musical notes as given in Table-1 and FIG. 7 illustrates placement of Fibonacci series within respective squares obtained as a result of recursive splitting.

TABLE 1

| Octave 1 | | Octave 2 | | Octave 3 | |
|---|---|---|---|---|---|
| 1 | A | 21 | B A | 377 | C G G |
| 2 | B | 34 | C D | 610 | F A G# |
| 3 | C | 55 | E E | 987 | B A (octave 4) G (octave 3) |
| 5 | D | 89 | A B (octave 3) | 1597 | A E (octave 3) B (octave 4) G (octave 3) |
| 8 | E | 144 | A D D | 2584 | B E (octave 3) A (octave 4) D (octave 3) |
| 13 | A C | 233 | B C C | 4181 | D A (octave 3) A (octave 4) A (octave 3) |
| | | | | 6765 | F G F E (octave 3) |

At step 514 of the method 500, the one or more hardware processors 104 are configured to place the plurality of aesthetic spaces to the mobile device as an overlay to a video file of a fixed duration, wherein the video file of the fixed duration is transmitted prior to a placement of the overlay. In an embodiment of the present disclosure, the video file transmission and the overlay creation is customizable at user end. The user can specify the duration after which the overlay is to be created once the video is transmitted.

At step 516 of the method 500, the one or more hardware processors 104 are configured to identify a plurality of eye-gaze hotspots of the grid wherein the plurality of eye-gaze hotspots are mapped with the plurality of aesthetic spaces generated within the grid, using the recursive splitting to calculate a shift difference. The system collects the gaze tracking data for assessing the response to the aesthetic placement of the transcoded product images in the form of the plurality of aesthetic spaces. The system ensures whether the user's gaze is naturally drawn to the aesthetic regions and coincides with the products positioned in the respective regions. Any variation of the gaze hotspots from the aesthetic zones (2,3) is communicated back to the system. The shift difference is a difference between a centroid of the hotspot and a centroid of the part of the display screen falling within the golden ratio dimensions, and wherein a value of the shift difference is optimized to a threshold value.

At step 518 of the method 500, the one or more hardware processors 104 are configured to dynamically align the plurality of aesthetic spaces generated within the grid to the eye-gaze hotspots of the grid, based on the shift difference, to create an individualistic personalization of the grid. Since the overall grid dimensions are chosen initially from the look-up table, the shift difference identified by the system is used to realign the overall grid for the next video in unit of 1 px×1 px, till there is alignment between the individual gaze tracking and the aesthetic grid. This allows for individualistic personalization of the grid.

A pseudocode of the entire method for aesthetic positioning of the products for the aesthetic nudging of the user experience and subconscious influence is presented in Table-2 as:

TABLE 2

```
BoundingRect {
  xPos, yPos, width, height;
  BoundingRect(smallerDimension, longerDimension, rotation, orientation){ }
  getSmallerDimension( ) {
```

TABLE 2-continued

```
        return (width =< height) ? width : height;
    };
}
Square : BoundingRect {
    Square(dimention){ }
    getDimension( );
}; // is a rectangle
MaxFingerTipRect {
    width, height;
}
function getMaxFingerTipRect( ) {
    return new MaxFingerTipRect(const, const);
}
function getGoldenRatio( ) {
    return 1.618;
}
enum Rotation {
    ROTATE_CLOCKWISE,
    ROTATE_ANTICLOCKWISE
};
enum Orientation {
    ORIENTATION_PORTRAIT,
    ORIENTATION_LANDSCAPE
};
function splitRect(BoundingRect boundingRect, Rotation rotation, Orientation
orientation) {
    return BoundingRect[ ] = {
        new BoundingRect( ),
        new BoundingRect( )
    }
}
function recursiveGoldenRatio(BoundingRect boundingRect, Rotation
rotation, Orientation orientation, Queue squareQue, Label parentLabel) {
    const fingerTipRect = getMaxFingerTipRect( );
    // stop if region gets smaller than touchable finger area size.
    if(boundingRect.width <= fingerTipRect || boundingRect.height <=
fingerTipRect)
        return;
    // if region is a square then use squareSplitting subroutine.
    if(boundingRect.height == boundingRect.width) {
        regionLabel = squareQue.length( );
        squareQue.push(new ProductPlacementRegion(regionLabel, parentLabel,
boundingRect));
        splitSquare(boundingRect, rotation, orientation, squareQue, regionLabel);
        return;
    }
    // split and recurse
    subRegions = splitRect(boundingRect, rotation);
    subRegions.forEach(function(subRect){
        recursiveGoldenRatio(subRect, rotation, orientation, parentLabel);
    });
}
function splitSquare(Square square, Rotation rotation, Orientation orientation,
Queue squareQue, Label parentLabel) {
        // since we are now splitting a square the new edge will be
smallerDimension of the newRectangle,
        // and square's width will be new longer Dimension of the newRectangle.
        newSmallerDimension = square.getDimension( ) / getGoldenRatio( )); //
example: 5 / 1.618 = 3.09
        newLongerDimension = square.width;        // hence new rect will be
(3.09, 5)
                                    // hence new square will be (3.09, 3.09)
        // recursively split the newSquare
        newSubSquare = new Square(newSmallerDimension);
        recursiveGoldenRatio(newSubSquare, rotation, orientation, squareQue,
parentLabel);
        // recursively split the new rectangle as per the golden ratio.
        newSubRectangle = new BoundingRect(
            newSmallerDimension,
            newLongerDimension,
            rotation,
            orientation
        );
        recursiveGoldenRatio(newSubRectangle, rotation, orientation, squareQue,
parentLabel);
}
// Top level main function for screen splitting
function getProductPlacementRegions( ) {
    BoundingRect screenBoundingRect = deviceConfiguration.getScreenRect( );
    Orientation screenOrientation = deviceConfiguration.getScreenOrientation( );
```

TABLE 2-continued

```
// ORIENTATION_LANDSCAPE or ORIENTATION_PORTRAIT
   Rotation productPlacementDirection = userPreference.getDirection( ); //
ROTATE_CLOCKWISE or ROTATE_ANTICLOCKWISE
   // A queue to hold all the candidate squares for product placement.
   Queue squareQue = new Queue( );
   // Recursively split the screen rectangle using golden ratio into pairs of
squares and rectangles.
   recursiveGoldenRatio(screenBoundingRect, productPlacementDirection,
screenOrientation, squareQue);
   // Return all aesthetically positioned product placement regions.
   return squareQue;
}
```

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein addresses unresolved problem of nudging the subconscious mind of a person by utilizing the aesthetic potential of a plurality of positions within the display screen of the mobile device. The aesthetic spaces are created by carefully partitioning the display screen based on golden ratio principle through recursively splitting that results in a plurality of squares and plurality of rectangles. The transcoded images of the products are placed in each square of the plurality of squares obtained by recursive splitting. The aesthetic spaces are supplemented to provide an aural experience to a user when the user mobile device is in an audio-enabled mode. The one or more audio files are embedded to each aesthetic space which are played upon tapping/touching the aesthetic spaces. The present disclosure also provides a haptic feedback to the user when mobile device is in haptic-enabled mode and the user taps/touches the aesthetic spaces.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for subconscious nudging, the method comprising:

receiving, via one or more hardware processors, (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive splitting in one of (a) a clock-wise direction, and (b) an anti-clockwise direction;

obtaining, via the one or more hardware processors, a plurality of golden ratio dimensions associated with the plurality of dimensions of the display screen from a look-up table, wherein a part of the display screen falling within the golden ratio dimensions forms a grid;

recursively splitting, via the one or more hardware processors, the grid using the GoldenRatio( ) function to obtain a plurality of sub-grids, wherein at each split, the grid is partitioned into a square and a rectangle, and wherein the recursive splitting is terminated upon achieving at least one of two conditions: (a) a last sub-grid of the plurality of sub-grids has a dimension equal to or below a pre-defined size, and (b) the last sub-grid is a square, and wherein the recursive splitting generates a plurality of squares and a plurality of rectangles;

storing, via the one or more hardware processors, (a) the plurality of squares into a first queue, and (b) a plurality of transcoded product images to be advertised in a second queue;

iteratively obtaining, via the one or more hardware processors, a plurality of aesthetic spaces, wherein each aesthetic space of the plurality of aesthetic spaces is created by placing at least one transcoded product image of the plurality of transcoded product images to be advertised on at least one square of the plurality of squares, and wherein each square of the plurality of squares in the first queue and each transcoded product image of the plurality of transcoded product images in the second queue are called in a sequential manner to form the aesthetic space in a plurality of steps wherein, in a first step of the plurality of steps, a complementary color scheme to a color palette of a current transcoded product image of the plurality of transcoded product images in the second queue is generated, in a second step of the plurality of steps, the complementary color scheme with a specified transparency level is applied to a current square of the plurality of squares in the first queue, and in a third step of the plurality of steps, the current transcoded product image among the plurality of transcoded product images in the second queue is placed in the current square of the plurality of squares in the first queue, wherein the complementary color scheme with the specified transparency level is employed to the current square;

embedding, via the one or more hardware processors, one or more audio streams, each having a plurality of harmonic frequencies to each aesthetic space of the plurality of aesthetic spaces, wherein the one or more audio streams are played upon tapping each aesthetic space of the plurality of aesthetic spaces on the display screen, and wherein at each tapping, an aural feedback is provided to the user when the mobile device of the user is in an audio-enabled mode;

placing, via the one or more hardware processors, the plurality of aesthetic spaces to the mobile device as an overlay to a video file of a fixed duration, wherein the video file of the fixed duration is transmitted prior to a placement of the overlay;

identifying, via the one or more hardware processors, a plurality of eye-gaze hotspots of the grid, wherein the plurality of eye-gaze hotspots are mapped with the plurality of aesthetic spaces generated within the grid, using the recursive splitting to calculate a shift difference; and dynamically aligning, via the one or more hardware processors, the plurality of aesthetic spaces generated within the grid to the eye-gaze hotspots of the grid, based on the shift difference, to create an individualistic personalization of the grid.

2. The method of claim 1, wherein the shift difference is a difference between a centroid of the hotspot and a centroid of the part of the display screen falling within the golden ratio dimensions, and wherein a value of the shift difference is optimized to a threshold value.

3. The method of claim 1, wherein a haptic feedback is provided to the user in response to the tapping of each of the aesthetic spaces, when the mobile device of the user is in a haptic-enabled mode.

4. The method of claim 1, wherein the one or more audio streams embedded to the plurality of aesthetic spaces create an aural experience to the user when the mobile device is in the audio-enabled mode, wherein tapping of each aesthetic space of the plurality of aesthetic spaces on the display screen creates a tactile experience to the user when the mobile device is in the haptic-enabled mode, and wherein the aural experience and the tactile experience collectively contributes to the aesthetic experience of the user.

5. The method of claim 1, wherein in the sequential manner of calling the current square of the plurality of the squares in the first queue and the current product image of the plurality of product images in the second queue, a second square of the plurality of squares in the first queue and a first product of the plurality of product images in the second squares in the first queue is kept blank.

6. A system, comprising:

a memory storing instructions;

one or more communication interfaces; and one or more hardware processors coupled to the memory via the one or more communication interfaces, wherein the one or more hardware processors are configured by the instructions to:

receive (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive splitting in one of (a) a clock-wise direction, and (b) an anti-clockwise direction;

obtain a plurality of golden ratio dimensions associated with the plurality of dimensions of the display screen from a look-up table, wherein a part of the display screen falling within the golden ratio dimensions forms a grid;

recursively split the grid using the GoldenRatio( ) function to obtain a plurality of sub-grids, wherein at each split, the grid is partitioned into a square and a rectangle, and wherein the recursive splitting is terminated upon achieving at least one of two conditions: (a) a last sub-grid of the plurality of sub-grids has a dimension equal to or below a pre-defined size, and (b) the last sub-grid is a square, and wherein the recursive splitting generates a plurality of squares and a plurality of rectangles;

store (a) the plurality of squares into a first queue, and (b) a plurality of transcoded product images to be advertised in a second queue;

iteratively obtain a plurality of aesthetic spaces, wherein each aesthetic space of the plurality of aesthetic spaces is created by placing at least one transcoded product image of the plurality of transcoded product images to be advertised on at least one square of the plurality of squares, and wherein each square of the plurality of squares in the first queue and each transcoded product image of the plurality of transcoded product images in the second queue are called in a sequential manner to form the aesthetic space in a plurality of steps wherein, in a first step of the plurality of steps, a complementary color scheme to a color palette of a current transcoded product image of the plurality of transcoded product images in the second queue is generated, in a second step of the plurality of steps, the complementary color scheme with a specified transparency level is applied to a current square of the plurality of squares in the first queue, and in a third step of the plurality of steps, the current transcoded product image among the plurality of transcoded product images in the second queue is placed in the current square of the plurality of squares in the first queue, wherein the complementary color scheme with the specified transparency level is employed to the current square;

embed one or more audio streams, each having a plurality of harmonic frequencies to each aesthetic space of the plurality of aesthetic spaces, wherein the one or more audio streams are played upon tapping each aesthetic space of the plurality of aesthetic spaces on the display screen, and wherein at each tapping, an aural feedback is provided to the user when the mobile device of the user is in an audio-enabled mode;

place the plurality of aesthetic spaces to the mobile device as an overlay to a video file of a fixed duration, wherein the video file of the fixed duration is transmitted prior to a placement of the overlay;

identify a plurality of eye-gaze hotspots of the grid, wherein the plurality of eye-gaze hotspots are mapped with the plurality of aesthetic spaces generated within the grid, using the recursive splitting to calculate a shift difference; and dynamically align the plurality of aesthetic spaces generated within the grid to the eye-gaze hotspots of the grid, based on the shift difference, to create an individualistic personalization of the grid.

7. The system of claim 6, wherein the shift difference is a difference between a centroid of the hotspot and a centroid of the part of the display screen falling within the golden ratio dimensions, and wherein a value of the shift difference is optimized to a threshold value.

8. The system of claim 6, wherein a haptic feedback is provided to the user in response to the tapping of each of the aesthetic spaces, when the mobile device of the user is in a haptic-enabled mode.

9. The system of claim 6, wherein the one or more audio streams embedded to the plurality of aesthetic spaces create an aural experience to the user when the mobile device is in the audio-enabled mode, wherein tapping of each aesthetic space of the plurality of aesthetic spaces on the display screen creates a tactile experience to the user when the mobile device is in the haptic-enabled mode, and wherein the aural experience and the tactile experience collectively contributes to the aesthetic experience of the user.

10. The system of claim 6, wherein in the sequential manner of calling the current square of the plurality of the squares in the first queue and the current product image of the plurality of product images in the second queue, a second square of the plurality of squares in the first queue and a first product of the plurality of product images in the second squares in the first queue is kept blank.

11. One or more non-transitory machine-readable information storage mediums comprising one or more instructions which when executed by one or more hardware processors cause:

receiving (a) a plurality of dimensions of a display screen of a mobile device, and (b) a current orientation of the mobile device held by a user, wherein the current orientation of the mobile device is dynamically updated and is represented using a GoldenRatio( ) function to initiate a recursive splitting in one of (a) a clock-wise direction, and (b) an anti-clockwise direction;

obtaining a plurality of golden ratio dimensions associated with the plurality of dimensions of the display screen from a look-up table, wherein a part of the display screen falling within the golden ratio dimensions forms a grid;

recursively splitting the grid using the GoldenRatio( ) function to obtain a plurality of sub-grids, wherein at each split, the grid is partitioned into a square and a rectangle, and wherein the recursive splitting is terminated upon achieving at least one of two conditions: (a) a last sub-grid of the plurality of sub-grids has a dimension equal to or below a pre-defined size, and (b) the last sub-grid is a square, and wherein the recursive splitting generates a plurality of squares and a plurality of rectangles;

storing (a) the plurality of squares into a first queue, and (b) a plurality of transcoded product images to be advertised in a second queue;

iteratively obtaining a plurality of aesthetic spaces, wherein each aesthetic space of the plurality of aesthetic spaces is created by placing at least one transcoded product image of the plurality of transcoded product images to be advertised on at least one square of the plurality of squares, and wherein each square of the plurality of squares in the first queue and each transcoded product image of the plurality of transcoded product images in the second queue are called in a sequential manner to form the aesthetic space in a plurality of steps wherein, in a first step of the plurality of steps, a complementary color scheme to a color palette of a current transcoded product image of the plurality of transcoded product images in the second queue is generated, in a second step of the plurality of steps, the complementary color scheme with a specified transparency level is applied to a current square of the plurality of squares in the first queue, and in a third step of the plurality of steps, the current transcoded product image among the plurality of transcoded product images in the second queue is placed in the current square of the plurality of squares in the first queue, wherein the complementary color scheme with the specified transparency level is employed to the current square;

embedding one or more audio streams, each having a plurality of harmonic frequencies to each aesthetic space of the plurality of aesthetic spaces, wherein the one or more audio streams are played upon tapping each aesthetic space of the plurality of aesthetic spaces on the display screen, and wherein at each tapping, an aural feedback is provided to the user when the mobile device of the user is in an audio-enabled mode;

placing the plurality of aesthetic spaces to the mobile device as an overlay to a video file of a fixed duration, wherein the video file of the fixed duration is transmitted prior to a placement of the overlay;

identifying a plurality of eye-gaze hotspots of the grid, wherein the plurality of eye-gaze hotspots are mapped with the plurality of aesthetic spaces generated within the grid, using the recursive splitting to calculate a shift difference; and dynamically aligning the plurality of aesthetic spaces generated within the grid to the eye-gaze hotspots of the grid, based on the shift difference, to create an individualistic personalization of the grid.

12. The one or more non-transitory machine-readable information storage mediums of claim 11, wherein the shift difference is a difference between a centroid of the hotspot and a centroid of the part of the display screen falling within the golden ratio dimensions, and wherein a value of the shift difference is optimized to a threshold value.

13. The one or more non-transitory machine-readable information storage mediums of claim 11, wherein a haptic feedback is provided to the user in response to the tapping of each of the aesthetic spaces, when the mobile device of the user is in a haptic-enabled mode.

14. The one or more non-transitory machine-readable information storage mediums of claim 11, wherein the one or more audio streams embedded to the plurality of aesthetic spaces create an aural experience to the user when the mobile device is in the audio-enabled mode, wherein tapping of each aesthetic space of the plurality of aesthetic spaces on the display screen creates a tactile experience to the user when the mobile device is in the haptic-enabled mode, and wherein the aural experience and the tactile experience collectively contributes to the aesthetic experience of the user.

15. The one or more non-transitory machine-readable information storage mediums of claim 11, wherein in the sequential manner of calling the current square of the plurality of the squares in the first queue and the current product image of the plurality of product images in the second queue, a second square of the plurality of squares in the first queue and a first product of the plurality of product images in the second squares in the first queue is kept blank.

* * * * *